UNITED STATES PATENT OFFICE.

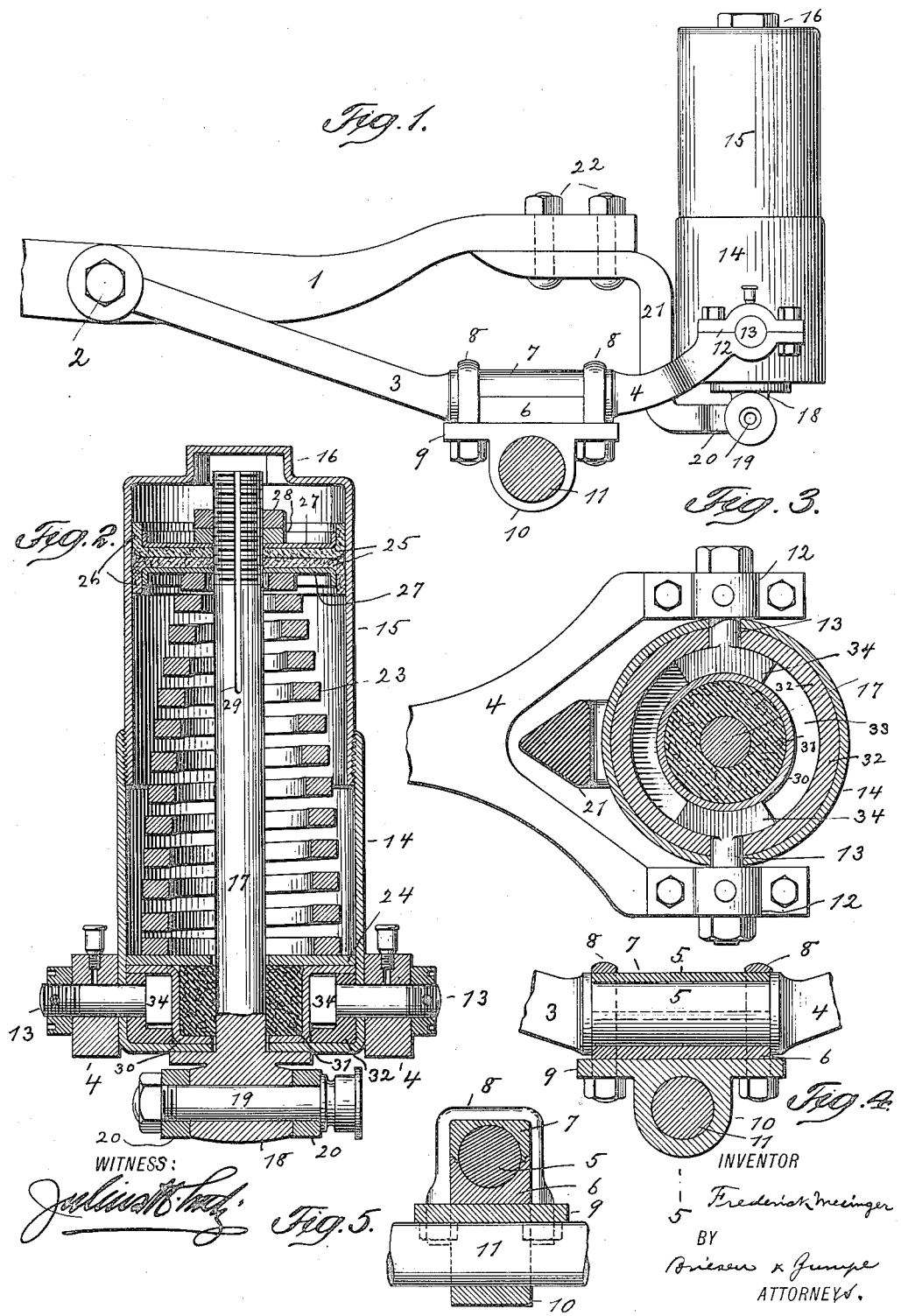

FREDERICK MESINGER, OF NEW YORK, N. Y.

SHOCK-ABSORBER.

1,173,205.  Specification of Letters Patent.  Patented Feb. 29, 1916.

Application filed July 17, 1915. Serial No. 40,372.

*To all whom it may concern:*

Be it known that I, FREDERICK MESINGER, a citizen of the United States, and a resident of New York city, county of Bronx, and State of New York, have invented certain new and useful Improvements in Shock-Absorbers, of which the following is a specification.

This invention relates to a novel shock absorber for automobiles, which possesses great resiliency, is not liable to break or bind, and is noiseless in operation.

In the accompanying drawing, Figure 1 is a side elevation of a shock absorber embodying my invention; Fig. 2 a longitudinal section thereof; Fig. 3 a horizontal section through the lower part thereof; Fig. 4 a longitudinal section through the axle bearing, and Fig. 5 a section on line 5—5, Fig. 4.

To the frame or chassis 1, is pivoted at 2 the forward end of a main bracket or arm 3, the rear end of which is forked as at 4. Bracket 3, is furnished with a cylindrical section 5 which is supported upon a pillow 6, to which cap 7 is secured by yokes 8, the base 9 of the pillow having a bearing 10 for the rear automobile axle 11. By the construction described the axle is free to tilt on cylindrical section 5 at right angles to the axis of the vehicle in the manner required during operation.

The two members of fork 4 carry bearings 12 adapted to accommodate a pair of protruding pivots 13, upon which is mounted the lower threaded section 14 of a cylindrical casing which is straddled by the fork and is apertured for the reception of the pivots. The upper section 15 of the casing is furnished with a hexagonal head 16, so that the casing may be opened for regulating and other purposes.

Through casing 14, 15 extends axially a bolt 17 that is provided at its protruding lower end with a tubular bearing 18. This bearing is by a pintle 19 pivotally secured to the forked end 20 of an arm or second support 21 which is straddled by fork 4, and is bolted to chassis 1, at at 22 so as to form part thereof. Bolt 17 is encompassed by a strong spiral spring 23 housed within casing 14, 15 and resting upon a metal disk or base plate 24. At its upper contracted end spring 23 abuts against the lower face of an adjustable apertured head which is mounted on the bolt, the bolt in conjunction with the head constituting a plunger. The head is composed of a pair of leather washers 25, having flanged ends 26 and of upper and lower flanged metal disks 27 flanking said washers. The uppermost of these disks is engaged by one member of a pair of lock nuts 28 mounted on the upper threaded end of bolt 17, and by means of which the tension of the spring may be regulated. A longitudinal groove 29 formed in the upper part of bolt 17, and passing through head 25, 27, constitutes a vent.

Base plate 24, is supported upon the upper flanged end of a cup 30, accommodated within the bottom of casing 14 and charged with a fiber packing 31 that surrounds bolt 17. Between cup 30 and casing 14 there is fitted a metal insert 32 through the flange of which the pivots 13 pass. Within this insert there is formed a clearance 33 within which are received concaved shoes 34 carried by the pivots 13 and straddling cup 30.

In use, the jolts will cause the plunger to play within the casing so that in this way the shocks are effectively absorbed by spring 23, it being of course understood that the device is duplicated so as to protect both sides of the vehicle.

The apparatus is not liable to get out of order, is very sensitive, and owing to the pivotal connections of the casing and plunger with their supports, any binding of the parts is effectively prevented.

I claim:

1. A shock absorber comprising a frame, a forked arm pivoted thereto, an axle bearing carried by the arm, a casing straddled by the arm and having a pair of protruding pivots that are mounted in said arm, a plunger within the casing, said plunger having a lower protruding end that is pivoted to the frame, and a spring within the casing that is engaged by the plunger.

2. A shock absorber comprising a frame, a forked arm pivoted thereto, and provided with a cylindrical section, a pillow engaged by said section, an axle bearing supporting the pillow and adapted to tilt on the cylindrical section at right angles thereto, a casing pivotally secured to the arm, an inclosed plunger that is pivoted to the frame, and a spring housed within the casing and engaged by the plunger.

3. A shock absorber comprising a forked frame, a forked arm pivoted thereto and straddling the forked frame, an axle bearing carried by the arm, a casing straddled by the arm and having a pair of protruding pivots that are mounted in said arm, a plunger within the casing, said plunger having a lower protruding end that is pivoted to the forked frame, and a spring within the casing that is engaged by the plunger.

4. A shock absorber comprising a casing, a plunger extending axially therethrough, a spiral spring housed within the casing and engaged by the plunger, a cup beneath the spring, a packing within the cup, a support, pivots carried by said support and extending into the casing, and concaved shoes on the inner ends of the pivots that engage the cup.

5. A shock absorber comprising a casing, a plunger extending axially therethrough, a spiral spring housed within the casing and engaged by the plunger, a cup beneath the spring, a packing within the cup, a flanged reinforcing member surrounding the cup, a support, pivots carried by the support and extending through the casing and reinforcing member, and concaved shoes on the inner ends of the pivots that engage the cup.

6. A shock absorber comprising a first support, a casing, pivots carried by the support and projecting into the casing, a second support, a plunger pivoted thereto and extending axially into the casing, a spiral spring housed within the casing and engaged by the plunger, a cup beneath the spring, a packing within the cup, and shoes on the pivots that engage the cup.

FREDERICK MESINGER.